United States Patent
Ben Artsi et al.

(10) Patent No.: US 9,143,368 B1
(45) Date of Patent: Sep. 22, 2015

(54) SYSTEMS AND METHODS FOR REDUCING QUANTIZATION ERRORS USING ADJUSTABLE EQUALIZER GRANULARITIES

(71) Applicant: Marvell Israel (M.I.S.L) Ltd., Yokneam (IL)

(72) Inventors: Liav Ben Artsi, Nahariya (IL); Miki Moyal, Bet-Hanaya (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 0 days.

(21) Appl. No.: 14/558,140

(22) Filed: Dec. 2, 2014

Related U.S. Application Data

(60) Provisional application No. 61/913,802, filed on Dec. 9, 2013.

(51) Int. Cl.
*H04L 27/01* (2006.01)
*H04L 25/03* (2006.01)

(52) U.S. Cl.
CPC .............................. *H04L 25/03057* (2013.01)

(58) Field of Classification Search
CPC .............. H04L 25/03; H04L 25/03885; H04L 25/03006; H04L 25/03019; H04L 25/063; H04L 25/03038; H04L 25/03057; H04L 2025/03592; H04L 27/01; H04L 7/0087
USPC .......... 375/229, 230, 231, 232, 233, 234, 316
See application file for complete search history.

(56) References Cited

U.S. PATENT DOCUMENTS

| | | | |
|---|---|---|---|
| 8,867,602 B1 * | 10/2014 | Mobin et al. ................... | 375/232 |
| 2008/0056344 A1 * | 3/2008 | Hidaka ......................... | 375/232 |

* cited by examiner

*Primary Examiner* — Siu Lee

(57) ABSTRACT

Systems and methods are provided for an equalizer. An equalizer includes a first voltage correcting circuit configured to correct a communication signal by applying a first variable corrective voltage to the communication signal, the first corrective voltage having a voltage level selected according to a first adjustable granularity. A second voltage correcting circuit is configured to further correct the communication signal by applying a second variable corrective voltage to the communication signal, the second corrective voltage having a voltage level selected according to a second adjustable granularity that is different from the first adjustable granularity.

19 Claims, 8 Drawing Sheets

SYSTEMS AND METHODS FOR REDUCING QUANTIZATION ERRORS USING ADJUSTABLE EQUALIZER GRANULARITIES

CROSS-REFERENCE TO RELATED APPLICATIONS

The present application claims priority from U.S. Provisional Application Ser. No. 61/913,802 entitled "Tuning DFE Granularity," filed 9 Dec. 2013, the entirety of which is hereby incorporated by reference.

FIELD

This disclosure is related generally to signal equalization and more particularly to residual signal mitigation using an equalizer.

BACKGROUND

Channel losses, inter-symbol interferences, and signal reflections are just a few of many causes of receipt of imperfect communication signals at a receiver. Equalizers, such as decision feedback equalizers attempt to correct these imperfections to improve data signal detection and reduce transmission error rates.

The description above is presented as a general overview of related art in this field and should not be construed as an admission that any of the information it contains constitutes prior art against the present patent application.

SUMMARY

Systems and methods are provided for an equalizer. An equalizer includes a first voltage correcting circuit configured to correct a communication signal by applying a first variable corrective voltage to the communication signal, the first corrective voltage having a voltage level selected according to a first adjustable granularity. A second voltage correcting circuit is configured to further correct the communication signal by applying a second variable corrective voltage to the communication signal, the second corrective voltage having a voltage level selected according to a second adjustable granularity.

As another example, a method of equalizing a received communication signal includes correcting a communication signal at a decision feedback equalizer by applying a first variable corrective voltage to the communication signal, the first corrective voltage having a voltage level selected according to a first adjustable granularity. The communication signal is further corrected by applying a second variable corrective voltage to the communication signal, the second corrective voltage having a voltage level selected according to a second adjustable granularity.

DETAILED DESCRIPTION

Figure 1:
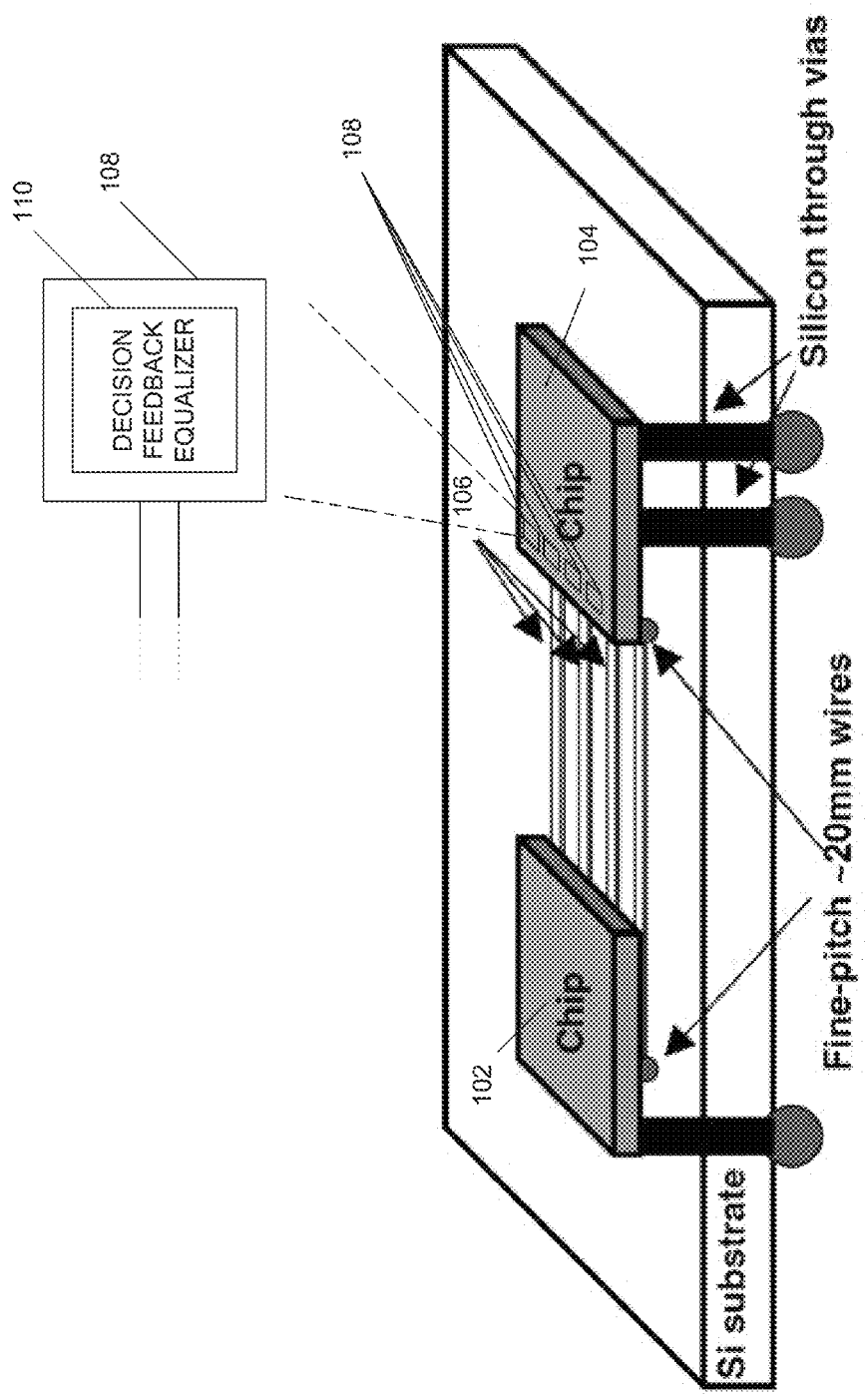
FIG. 1 is a diagram depicting a plurality of chip receivers.

FIG. 1 is a diagram depicting a plurality of chip receivers having adjustable equalizer granularities. Communication signals transmitted via a channel, such as a coupling between a transmitting chip and a receiving chip, are often received in an imperfect form based on factors such as channel losses, signal reflections, and inter-symbol interference. FIG. 1 depicts a system where a first chip 102 transmits communication signals to a second chip 104 (e.g., a chip positioned at a termination of a long reach Ethernet channel) over a plurality of carrier links 106. The second chip includes a plurality of receivers 108, such as Serializer/Deserializer (SERDES) receivers, that each includes a decision feedback equalizer 110. The decision feedback equalizer at the receivers 108 operate by subtracting an amount of voltage at different times following receipt of a communication signal pulse (e.g., a pulse indicating receipt of a 1-data value). Each time period after receipt of the voltage pulse where a correction is made is called a "tap" point, such that a first adjustment is made at a first tap point a first time period after the signal pulse, a second adjustment is made at a second tap point a second time period after the signal pulse, etc.

Figure 2:
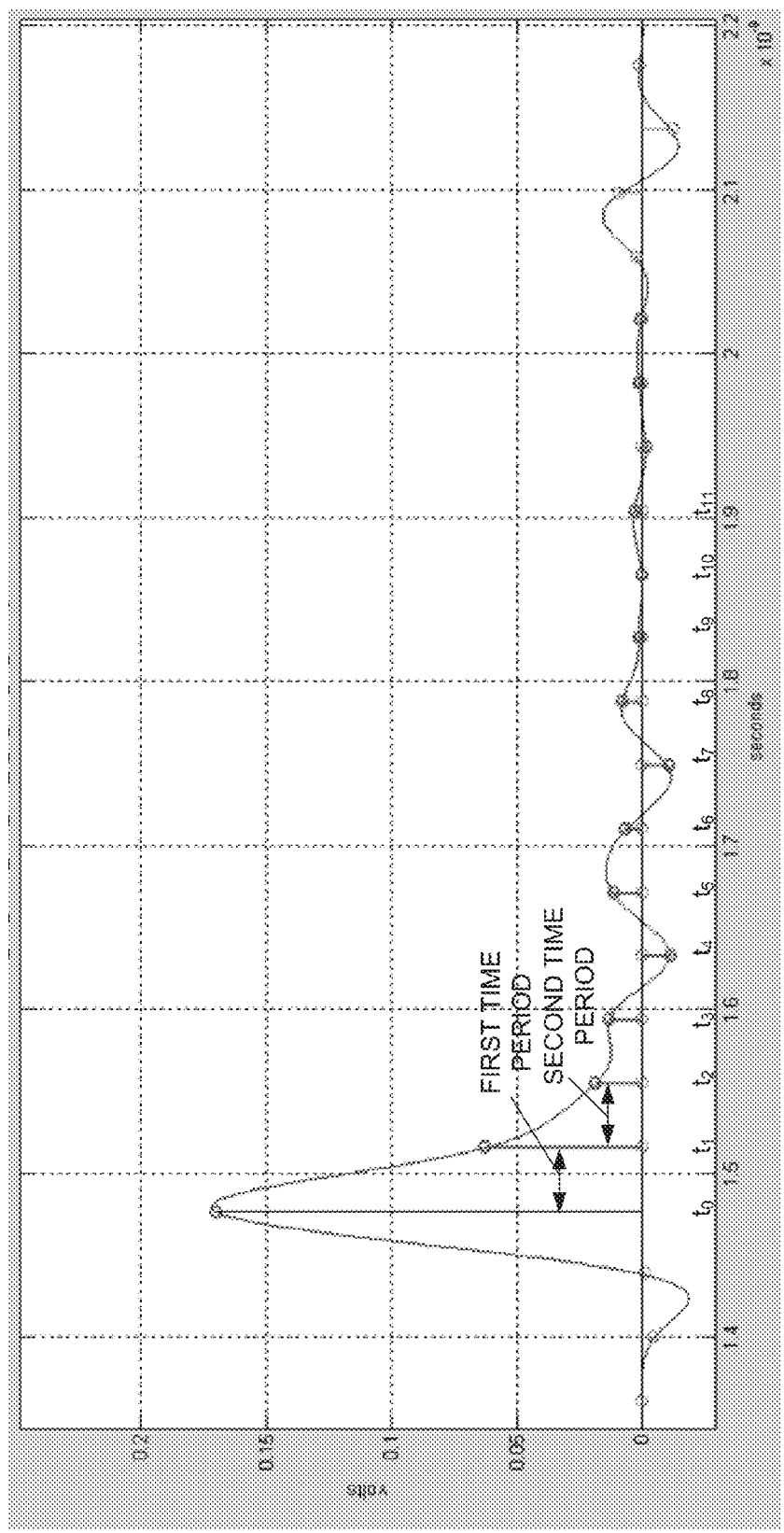
FIG. 2 is a diagram depicting a voltage pulse of a communication signal received at an equalizer of a receiver, such as depicted in FIG. 1, prior to equalization.

FIG. 2 is a diagram depicting an example of a voltage pulse of a communication signal received at an equalizer of a receiver, such as depicted in FIG. 1, prior to equalization. A voltage pulse is received at time $t_0$. In an ideal environment, following the pulse at to, the voltage at the receiver would quickly return to a zero level. As depicted in FIG. 2, however, in actual operation of a receiver the voltage does not quickly return to the zero level, but instead residual voltages from the voltage pulse dissipate over a number of subsequent times, $t_1$, $t_2$, $t_3$, . . . . These residual voltages, which typically are the result of inter-symbol interference, reflections, or other channel imperfections, are sub-optimal and can interfere with the detection of subsequent voltage pulses indicative of later sent data in the communication signal. An equalizer, in one embodiment of the disclosure, seeks to minimize these residual voltages by subtracting (or adding) voltages from the received signal at the indicated times, $t_1$, $t_2$, $t_3$, . . . . The amount of voltage subtracted at each time period is based on an expected residual voltage from the voltage pulse, such as a residual voltage measured during a training or calibration period of the equalizer.

It is noted that the amount of residual voltage that the equalizer seeks to minimize varies widely across the times (i.e., $t_1, t_2, t_3, \ldots$) at which voltage corrections are to be made. In the example of FIG. 2, at $t_1$, an equalizer would seek to eliminate 0.07 V, while at $t_8$, the equalizer would seek to eliminate 0.01 V, while at $t_9$ the equalizer would seek to eliminate 0.002 V, in an embodiment. These differences in the scale of correction can introduce difficulties into equalizer design. Equalizers typically are limited by a number of equally spaced levels which can be addressed (e.g., 16 levels). Thus, it is difficult to select a spacing of those levels that will be effective in subtracting the 0.07 V at $t_1$, the 0.01 V at $t_8$, and the 0.002 V at $t_9$. Adding more levels at a smaller step size increases complexity and cost of the equalizer, while a poor match of available levels (e.g., having 0.005 V step sizes to eliminate a 0.002 V residual voltage) results in equalization error, sometimes referred to as quantization error.

Figure 3:
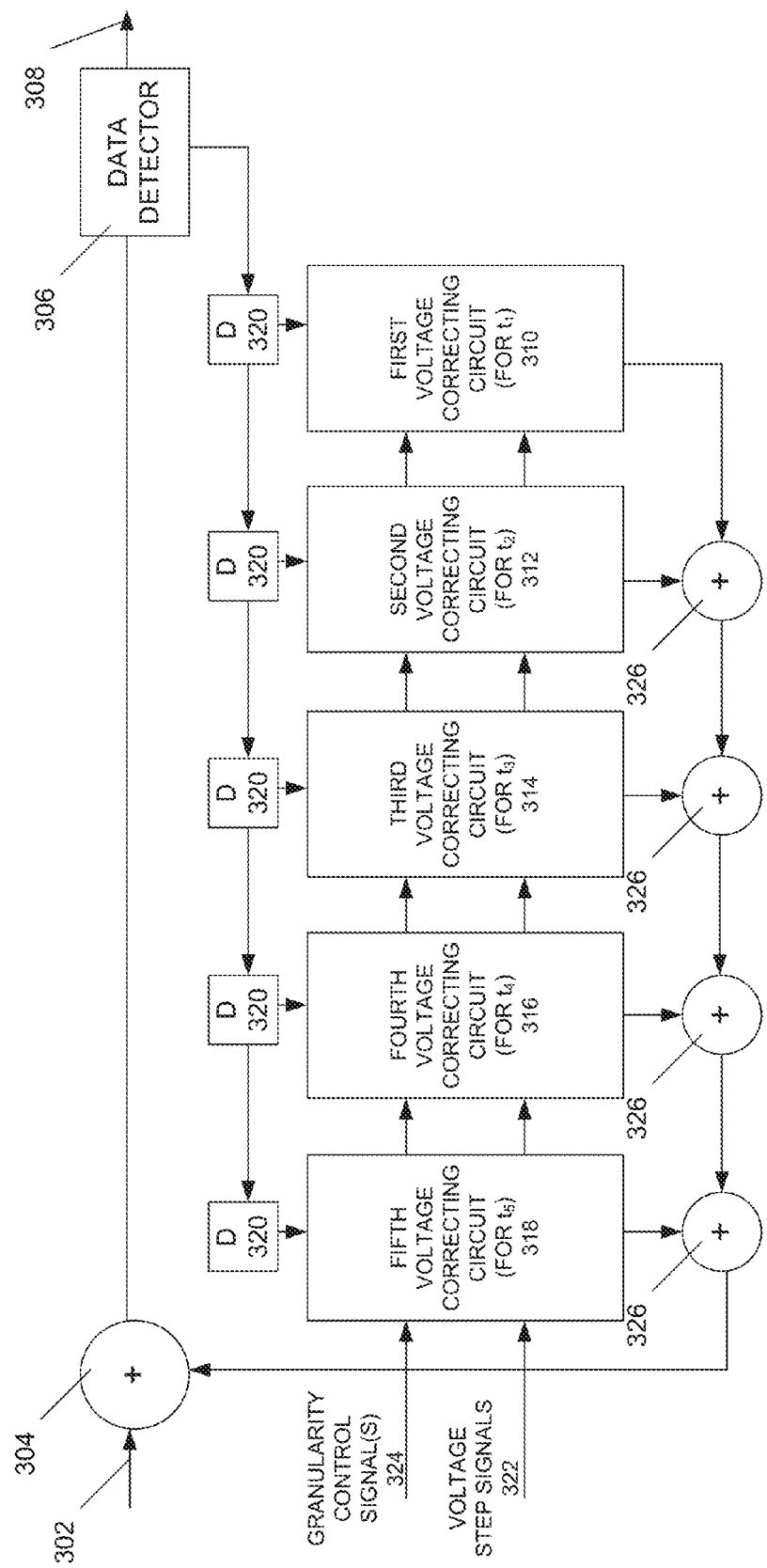
FIG. 3 is a diagram depicting an equalizer of a receiver, such as depicted in FIG. 1, having a plurality of voltage correcting circuits having adjustable granularities.

FIG. 3 is schematic a diagram depicting an equalizer of a receiver having a plurality of voltage correcting circuits having adjustable granularities, in accordance with an embodiment. A communication signal is received at an input 302 to the equalizer. Adjustments are made to the communication signal at 304, as described further herein, for example to add and/or subtract voltages to the signal in an embodiment. At 306, a data detector (e.g., a slicer) determines a data value of the communication signal. In one embodiment, the data detector 306 determines whether a voltage of the communication signal is above or below a threshold value. The data detector 306 outputs a results of its detecting (e.g., a 0 or a 1 signal) at 308. The data detector 306 also provides an indication of the detected signal to each of a plurality of voltage correcting circuits 310, 312, 314, 316, 318 via a set of delay circuits 320 (e.g., suitably flip flops in an embodiment).

The first voltage correcting circuit 310 is configured to subtract a voltage from the communication signal at 302 of FIG. 2 via adder 304 at $t_1$, one time period after receipt of a voltage pulse. The data detector 306 provides an indication of the voltage pulse to the first delay circuit 320, thus that indication is received by the first voltage correcting circuit 310 at or near time $t_1$. When the data detector 306 indicates that a voltage pulse was received at time $t_0$, the first voltage correcting circuit 310 is configured to output a voltage to be subtracted from the communication signal at time $t_1$ to attempt to eliminate the residual voltage from the voltage pulse. In an ideal embodiment configured to equalize the exemplary waveform received at 302, as shown in FIG. 2, the first voltage correcting circuit 310 outputs a voltage of −0.07 V to cancel the residual voltage at $t_1$. In one embodiment, the voltage amount to be subtracted to cancel the waveform at $t_1$ (e.g., 0.07 volts) is determined via an equalizer training/calibration period and communicated to the first voltage correcting circuit 310 via a voltage step signal 322 directed to first voltage correcting circuit 310. In one embodiment of the disclosure, that voltage step signal 322 identifies which available voltage (e.g., of 16 addressable voltages) the first voltage correcting circuit 310 should output at $t_1$.

A second voltage correcting circuit 312 is configured to subtract a voltage from the communication signal received at 302 via adder 304 at time $t_2$, two time periods after receipt of the voltage pulse. The data detector 306 provides an indication of receipt of the voltage pulse at or near time $t_2$ via two delay circuits 320. When the data detector 306 indicates that a voltage pulse was received at time $t_0$, the second voltage correcting circuit 312 is configured to output a voltage to be subtracted from the communication signal at time $t_2$ to attempt to remove the residual voltage from the voltage pulse. In an embodiment configured to equalize the exemplary waveform depicted in FIG. 2 received at 302, the second voltage correcting circuit 312 outputs a voltage of −0.02 V to cancel the residual voltage at $t_2$ (e.g., based on a voltage step signal command 322 directed to the second voltage correcting circuit 312). The equalizer of FIG. 3 further includes additional voltage correcting circuits 314, 316, 318 for subtracting voltages from the communication signal at times $t_3$, $t_4$, and $t_5$, respectively. The voltages to be subtracted at a particular time, as outputted by voltage correcting circuits 310, 312, 314, 316, and 318 are summed via adders 326 and provided to adder 304 for subtraction.

As noted above, it can be difficult for an equalizer to minimize residual voltages across widely varying residual voltage levels using a common granularity across each of the voltage correcting circuits 310, 312, 314, 316, 318 (e.g., while 0.0005 V steps are effective at eliminating the 0.07 V residual voltage at $t_1$, those 0.005 V steps are not effective at correcting the 0.002 V residual voltage at $t_9$). Thus, in an embodiment, the equalizer of FIG. 3 includes granularity control signals 324 used to set respective correction granularities (i.e., correction voltage step sizes) at the voltage correcting circuits 310, 312, 314, 316, 318. In one embodiment of the disclosure, granularities at each of the voltage correcting circuits 310, 312, 314, 316, 318 can be individually set using the granularity control signals 324 (e.g., based on identified expected residual voltages at a time associated with that voltage correcting circuit). In another embodiment, granularities are set for groups of voltage correcting circuits (e.g., 0.005 V steps for voltage correcting circuits 310, 312 and 0.0005 V steps for voltage correcting circuits 314, 316, 318 based on lower residual voltages being expected at times further from the voltage pulse). In a further embodiment, a common, adjustable granularity is set for all of the voltage correcting circuits 310, 312, 314, 316, 318 (e.g., based on a voltage level of the voltage pulse to guarantee a signal-to-noise ratio less than a threshold amount).

Figure 4:
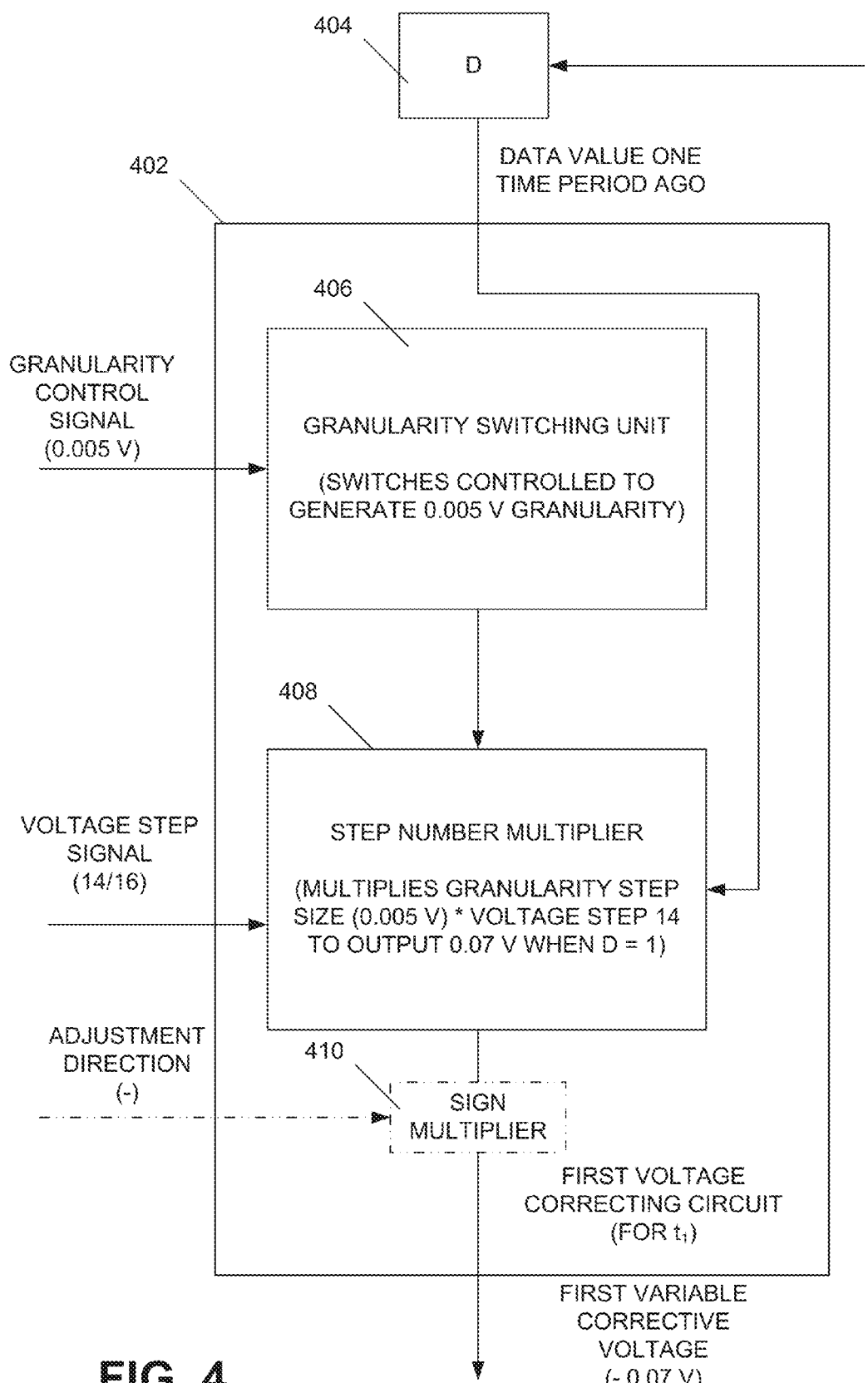
FIG. 4 is a functional block diagram depicting example operations of a first voltage correcting circuit for time $t_1$, such as depicted in FIG. 3.

FIG. 4 is a functional block diagram depicting example operations of a first voltage correcting circuit for time $t_1$, such as is depicted in FIG. 3 at 310. The first voltage correcting circuit 402 receives data from a delay circuit 404 that indicates content of a communication signal, such as content of that communication signal at time $t_0$. The data from the delay circuit 404 indicates when voltage pulses were present in the communication signal at to so that the first voltage correcting circuit 402 can output a corresponding correcting voltage at $t_1$ to attempt to minimize the residual voltage from that pulse at $t_0$. The correcting circuit 402 includes a granularity switching unit 406 that is configured to set the step size of the first voltage correcting circuit 402 based on a granularity control signal, such as is depicted in FIG. 3 at 324. In the example of FIG. 4, which seeks to reduce a residual voltage at $t_1$ of approximately 0.07 V (e.g., as determined during a training/calibration operation) from a pulse at $t_0$, the granularity control signal commands the granularity switching unit 406 to set a step size of 0.005 V. A step number multiplier 408 receives a voltage step signal, such as is depicted in FIG. 3 at 322, indicating which step, of sizes dictated by granularity switching unit 406, should be selected for generating the correcting voltage. The step number multiplier 408 multiplies the selected step number (i.e., 14) by the granularity (i.e., 0.005V) from 406 when the delay circuit 404 data indicates a voltage pulse at $t_0$:

$$V_{Multipier} = \text{Step}_{Selected} * \text{Granularity} + \text{Offset}_{Range},$$

where $V_{Multiplier}$ is the voltage outputted by the step number multiplier 408, $\text{Step}_{Selected}$ step indicated by the voltage step signal, granularity is the granularity selected by the granularity switching unit 406, and $\text{Offset}_{Range}$ indicates the start of the range of available voltages producible by the first voltage correcting circuit. In the example of FIG. 4, where a training time period has indicated that a 0.07 V residual voltage is to be corrected for at $t_0$, and the $\text{Offset}_{Range}$ of the first voltage correcting circuit 402 is 0 V, step 14 is indicated by the voltage step signal resulting in:

$$V_{Multipier} = 14 * 0.005 \text{ V} + 0 \text{ V} = 0.07 \text{ V}$$

being outputted from block 408. In one embodiment of the disclosure, the first voltage correcting circuit 402 includes a sign multiplier 410 that multiplies the output of the step number multiplier 408 by −1 when commanded by an adjustment direction input. The sign multiplier enables adjustment of residual voltages in both a positive direction (e.g., as desirable at $t_4$ of FIG. 2) and negative direction (e.g., as desirable at $t_1$ of FIG. 2). The first variable corrective voltage (e.g., −0.07 V) is outputted from the first voltage correcting circuit 402 at or near $t_1$ and is added to the communication signal (e.g., via adder 304 of FIG. 3) to correct the residual voltage from the voltage pulse at $t_0$.

Figure 5:
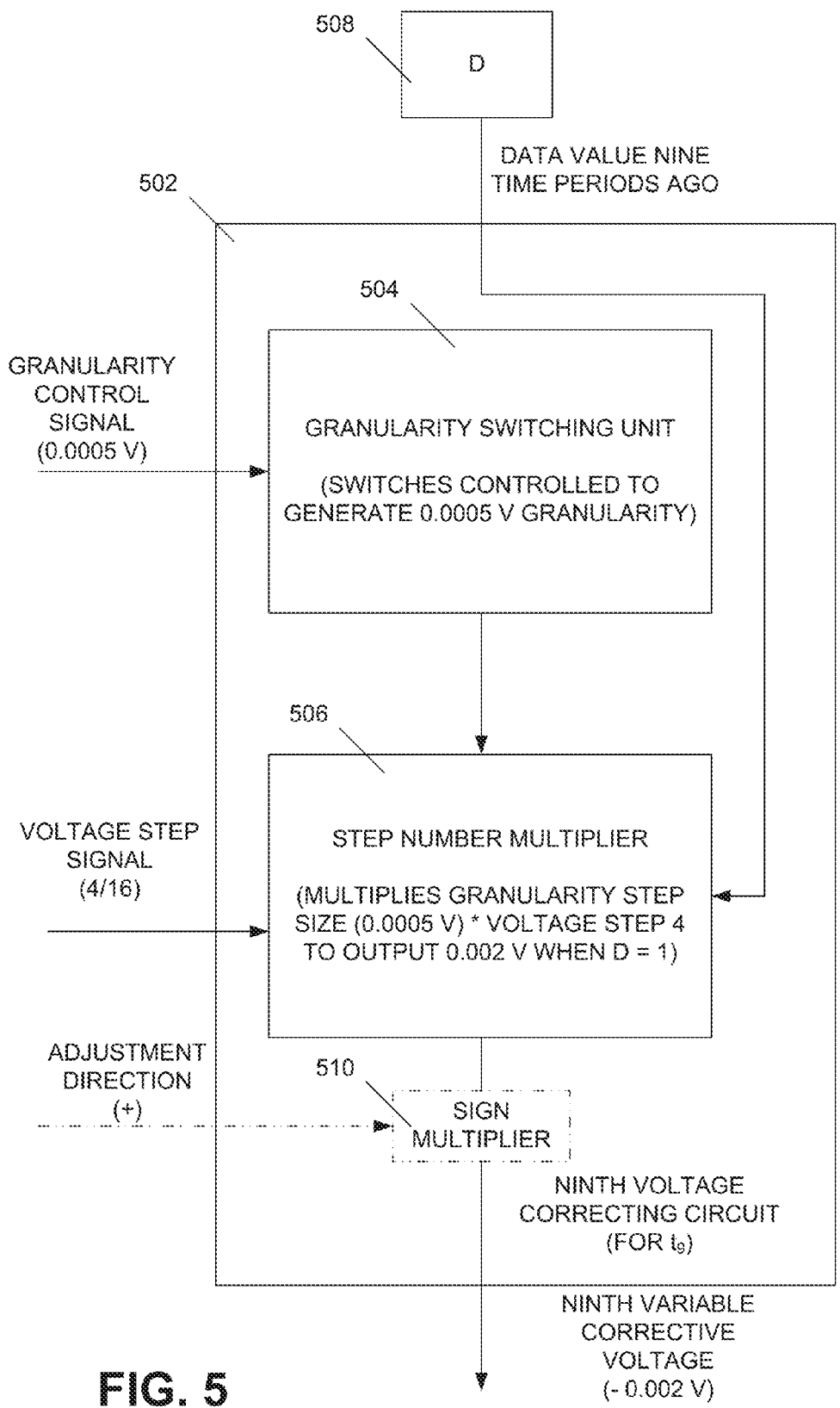
FIG. 5 is a functional block diagram depicting example operations of a ninth voltage correcting circuit, such as depicted in FIG. 3.

FIG. 5 is a functional block diagram depicting example operation of a ninth voltage correcting circuit 502. In the example of FIG. 5, the training period indicates that a 0.002 V residual voltage is to be corrected at $t_9$ from a voltage pulse at $t_0$. To accommodate correction at a magnitude of 0.002 V, the granularity switching unit is set to a granularity of 0.0005 V, being a different granularity then that set at voltage correcting circuit 402. A step number multiplier 506 is commanded to selected step 4 of 16 to generate the 0.002 V correcting voltage. With reference to the exemplary communication signal waveform depicted in FIG. 2, when data from the delay circuit 508 indicates a voltage pulse at to, the step number multiplier 506 outputs a voltage of 0.002 V according to:

$$V_{Multiplier}=4*0.0005\ V+0\ V=0.002\ V$$

A sign multiplier 510 is instructed by an adjustment direction command to multiply the 0.002 V output by −1 to generate a ninth variable corrective voltage −0.002 V so as to offset the residual voltage in the exemplary communication signal waveform depicted in FIG. 2 at or near location to.

The granularities of individual voltage correcting circuits of the plurality of voltage correcting circuits can be set in a variety of manners. In one embodiment of the disclosure, each of the voltage correcting circuits can have its granularity set independently, enabling customization of step sizes for correction on a per time period basis. In such an example, residual voltages from a voltage pulse can be measured at various time period taps during a training phase or operational phase to identify a residual voltage to be corrected, with an appropriate granularity being set accordingly. In another example, all of the voltage correcting circuits have their adjustable granularity set to a common step size. For example, such common granularity may be set based on a voltage level of a received voltage pulse or a voltage level of a largest residual time period (e.g., 0.07 V at $t_1$ in the example of FIG. 2). In some embodiments, such a configuration, where adjustable granularities are set to a common level across all of the voltage correcting circuits, can simplify circuitry while still providing sufficient equalization for the particular receiver associated with the equalizer for the characteristics of the communication signal expected to be received (e.g., as detected during a training time period).

Figure 6:
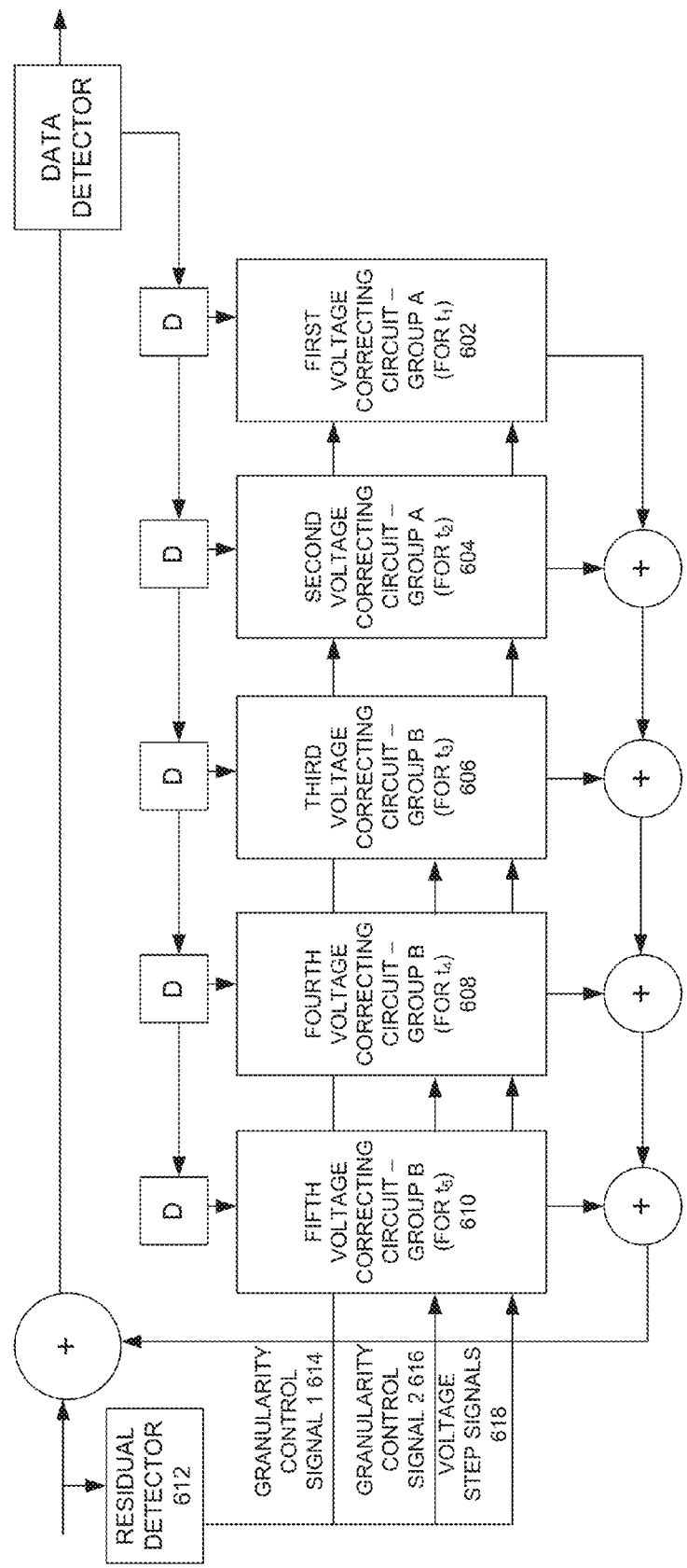
FIG. 6 is a block diagram depicting a plurality of voltage correcting circuits of a receiver, such as depicted in FIG. 1, divided into two granularity groups.

In a further embodiment, adjustable granularities are set for groups of voltage correcting circuits. FIG. 6 is a block diagram depicting a plurality of voltage correcting circuit divided into two granularity groups. In the example of FIG. 6, the granularities of the groups of voltage correcting circuits are set based on expected residual voltages to be corrected at different time periods. The example of FIG. 6 includes a first voltage correcting circuit 602 and a second voltage correcting circuit 604 in Group A, with a third voltage correcting circuit 606, a fourth voltage correcting circuit 608, and a fifth voltage correcting circuit 610 being in a second Group B. In one embodiment of the disclosure, the voltage correcting circuits 602, 604, 606, 608, 610 are grouped based upon a magnitude of residual voltages that those circuits are expected to correct. For example, as depicted in FIG. 2, residual voltages at $t_1$ and $t_2$ are larger in magnitude than those at $t_3$-$t_{11}$. Thus, in the embodiment of FIG. 6, the first and second voltage correcting circuits 602, 604 associated with $t_1$ and $t_2$, respectively, are included in Group A, while the third 606, fourth 608, and fifth 610 voltage correcting circuits are included in Group B. The voltage correcting circuits 602, 604 of Group A receive Granularity Control Signal 1 614 that sets the granularity of both of those voltage correcting circuits 602, 604 to a common step size (e.g., 0.005 V). The voltage correcting circuits 606, 608, 610 of Group B receive Granularity Control Signal 2 616 that sets the granularity of the three of those voltage correcting circuits 606, 608, 610 to a different common step size (e.g., 0.0005 V).

In one embodiment of the disclosure, the granularity control signals 614, 616 and the voltage step signals 618 are provided to the voltage correcting circuits 602, 604, 606, 608, 610 by a residual detector 612. The residual detector 612 operates during a training or calibration phase to identify residual voltages of a test voltage pulse received at the equalizer. In one embodiment, the residual detector identifies residual voltages at each of $t_0$, $t_1$, $t_2$, $t_3$, $t_4$, and $t_5$, or subsets thereof (e.g., $t_1$, $t_3$). The residual detector 612 then selects a granularity for each of Groups A and B of voltage correcting circuits 602, 604, 606, 608, 610 and a particular step for each of the voltage correcting circuits via 618 for making corrections to eliminate residual voltages from voltage pulses during an operational time period.

Figure 7:
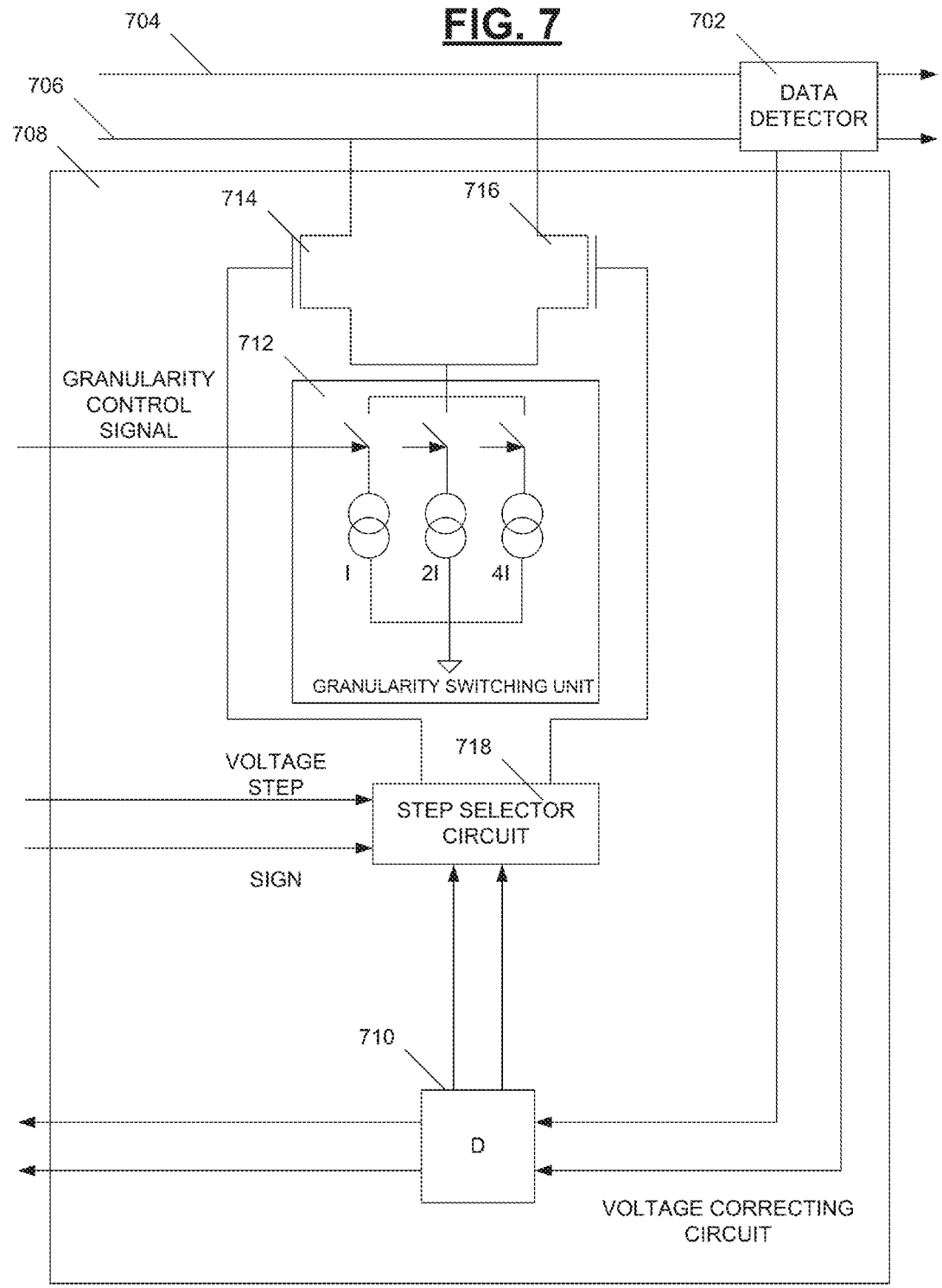
FIG. 7 is a schematic diagram depicting an example implementation of a voltage correcting circuit, such as depicted in FIG. 3.

FIG. 7 is a schematic diagram depicting an example implementation of a voltage correcting circuit. A data detector circuit 702 (e.g., a slicer circuit) monitors a differential data communication signal on two data lines 704, 706 to aid a voltage correcting circuit 708 in determining when voltage pulses have occurred on the data lines 704, 706 for which residual voltage correction is desirable. Data from the data detector circuit 702 is provided to one or more delay circuits 710, which aid the voltage correcting circuit 708 in applying a corrective voltage to the data lines 704, 706 a proper time period after the voltage pulse to minimize residual voltages. In the embodiment of FIG. 7, a granularity control signal controls a plurality of switches of a granularity switching unit 712. The switches of the granularity switching unit 712 enable generation of 8 different current levels out of the granularity switching unit 712. These currents effectively set a step size granularity of the voltage correcting circuit 708, where a pair of transistors 714, 716 operate as multipliers of the selected granularity step size from 712 and signals step number from a step selector circuit 718. The step selector circuit 718 receives a voltage step selection signal, a sign signal that indicates the positive or negative direction of correction, and a delayed data signal from delay circuit 710. The step selector circuit 718 outputs a signal that is indicative of the selected step, multiplied by −1 when the sign signal indicates a negative voltage signal to be output from the voltage correcting circuit, when the signal from the delay circuit 710 indicates that a voltage pulse was present in the communication signal on lines 704, 706 an appropriate number of time periods ago. The outputs of the step selector circuit 718 are provided to the gates of the multiplying transistors 714, 716 to control the voltages across those transistors 714, 716, based on the current generated by the granularity switching circuit, to apply the desired correcting voltage to the communication lines 704, 706.

Figure 8:
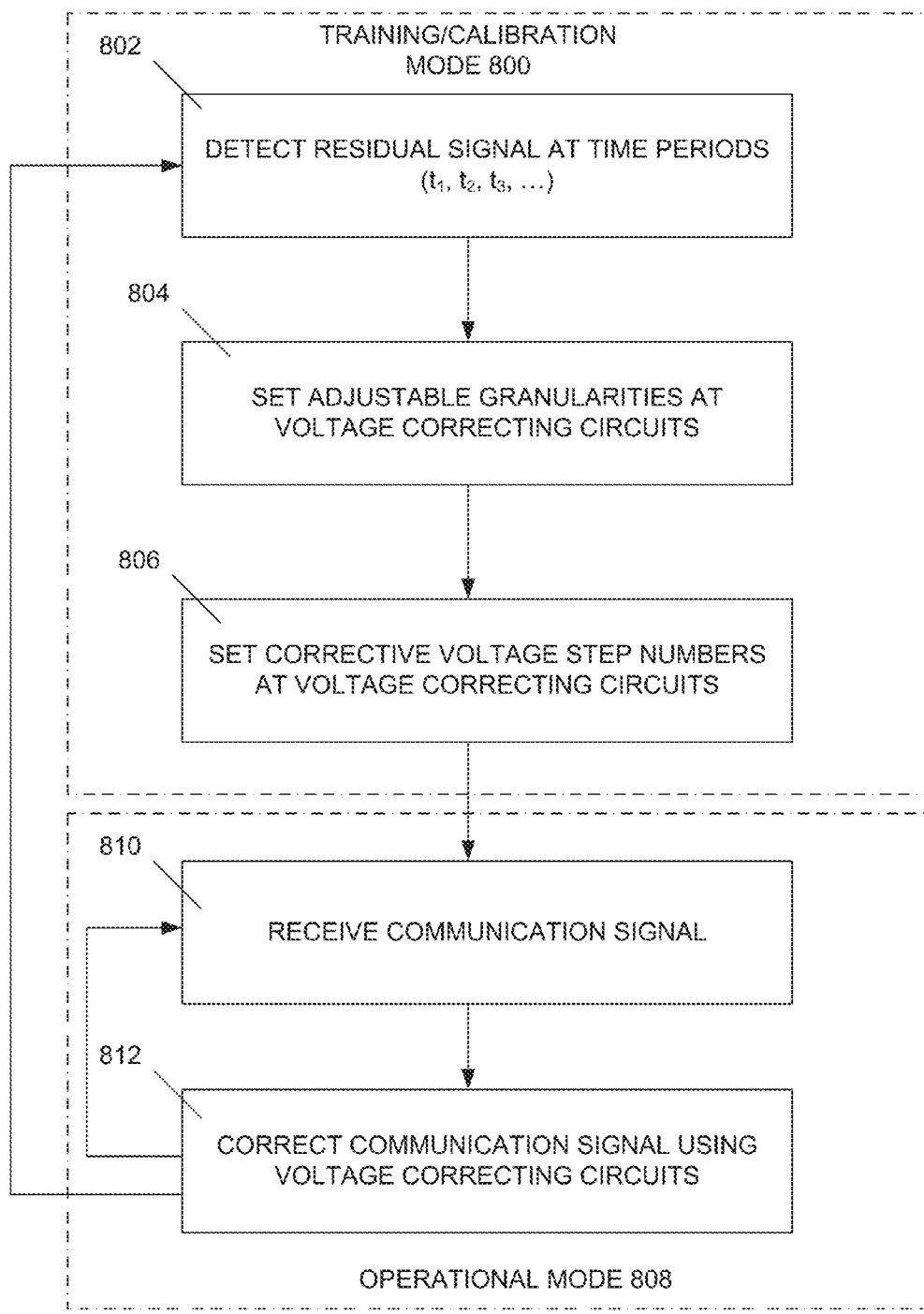
FIG. 8 is a flow diagram depicting a method of equalizing a received communication signal.

FIG. 8 is a flow diagram depicting a method of equalizing a received communication signal. During a training time period 800, a voltage pulse is transmitted on a data line at to, and residual voltage levels are detected at times $t_1, t_2, t_3, \ldots$ at 802. At 804, adjustable granularities are set at a plurality of voltage correcting circuits based on the detected residual voltage levels. At 806, corrective voltage step numbers are set for the voltage correcting circuits based on the detection at 802. In an operational mode 808, a communication signal is received at 810. At 812, when a voltage pulse is detected, the communication signal is corrected using the voltage correcting circuit. For example, in one embodiment, the communication signal is corrected by applying a first variable corrective voltage to the communication signal having a voltage level selected according to a first adjustable granularity at a first time period $t_1$, and the communication signal is further corrected by applying a second variable corrective voltage to the communication signal at a second time period $t_2$, where the second corrective voltage has a voltage level selected according to a second adjustable granularity. During an operational mode, the equalizer continues to receive voltage pulses of the communication signal at 810 and correct for residual voltages at 812.

In one embodiment of the disclosure, an equalizer (e.g., a decision feedback equalizer) periodically returns to the training mode 800 to adjust for variations in the system. For example, characteristics of the receiver, equalizer, or signals received at the equalizer change over time. In one embodiment, both granularities at 804 and selected steps at 806 are adjusted during revisits to the training mode 800. In other embodiments, subsequent training time periods 800 only adjust the step number selected for different voltage correcting circuits, while granularities are only set once or at more infrequent time intervals.

This application uses examples to illustrate the invention. The patentable scope of the invention includes other examples. For example, systems and methods as described herein could be implemented at a receiver positioned at a termination of an Ethernet channel.

It is claimed:

1. A method of equalizing a received communication signal, comprising:
   correcting a communication signal at a decision feedback equalizer by applying a first variable corrective voltage to the communication signal, the first variable corrective voltage having a voltage level selected according to a first adjustable granularity;
   further correcting the communication signal by applying a second variable corrective voltage to the communication signal, the second variable corrective voltage having a voltage level selected according to a second adjustable granularity that is different from the first adjustable granularity.

2. The method of claim 1, further comprising:
   detecting a signal level of the communication signal; and
   adjusting the first adjustable granularity based on the detected signal level.

3. The method of claim 1, wherein the voltage level of the first corrective voltage is set based on a first corrective voltage step number and a first corrective voltage step size.

4. The method of claim 1, further comprising:
   providing a signal to change the first adjustable granularity, wherein changing the first adjustable granularity changes the first corrective voltage step size.

5. The method of claim 4, wherein the first corrective voltage step size is indicative of the voltage magnitude between available voltage levels for the first corrective voltage, wherein the first corrective voltage step number selects the voltage level of the first corrective voltage from the available voltage levels.

6. The method of claim 1, wherein the communication signal includes a voltage pulse that represents data;
   wherein the first variable corrective voltage is applied to the signal a first time period after receiving the voltage pulse;
   wherein the second variable corrective voltage is applied to the signal a second time period after receiving the voltage pulse, the second time period being subsequent to the first time period.

7. The method of claim 1, further comprising:
   receiving a first voltage pulse of the communication signal;
   detecting a residual voltage level at a first time period after the first voltage pulse is received; and
   adjusting the first adjustable granularity based on the residual voltage level at the first time period after the first voltage pulse.

8. The method of claim 7, further comprising:
   detecting a residual voltage level at a second time period after the first voltage pulse is received, the second time period being subsequent to the first time period; and
   adjusting the second adjustable granularity based on the residual voltage level at the second time period after the voltage pulse.

9. The method of claim 7, wherein the detecting and the adjusting are performed during an equalizer training time period, and wherein the correcting and the further correcting are performed during an operational time period.

10. The method of claim 1, further comprising:
    commanding a first n stages of the decision feedback equalizer to apply variable corrective voltages to the communication signal using the first adjustable granularity; and
    commanding a second m stages of the decision feedback equalizer to apply variable corrective voltages to the communication signal using the second adjustable granularity.

11. An equalizer, comprising:
    a first voltage correcting circuit configured to correct a communication signal by applying a first variable corrective voltage to the communication signal, the first variable corrective voltage having a voltage level selected according to a first adjustable granularity; and
    a second voltage correcting circuit configured to further correct the communication signal by applying a second variable corrective voltage to the communication signal, the second variable corrective voltage having a voltage level selected according to a second adjustable granularity that is different from the first adjustable granularity.

12. The equalizer of claim 11, further comprising:
    a detection circuit configured to detect a signal level of the communication signal and to adjust the first adjustable granularity based on the detected signal level.

13. The equalizer of claim 12, wherein the first voltage correcting circuit includes a switch, wherein the detection circuit is configured to command operation of the switch to adjust the first adjustable granularity.

14. The equalizer of claim 12, wherein the detection circuit further comprises:
    a first time period detector configured to detect a residual voltage level a first time period after a voltage pulse of the communication signal is received and to command adjustment of the first adjustable granularity based on the residual voltage detected at the first time period after the voltage pulse;
    a second time period detector configured to detect a residual voltage level a second time period after the voltage pulse of the communication signal is received and to command adjustment of the second adjustable granularity based on the residual voltage detected at the second time period after the voltage pulse, the second time period being subsequent to the first time period.

15. A receiver system, comprising:
a plurality of data input signal lines;
an equalizer according to claim 12 associated with each of the plurality of data input signal lines configured to correct communication signals received on the data input signal lines.

16. The equalizer of claim 11, wherein the equalizer includes a first n voltage correcting circuits configured to correct the communication signal according to the first adjustable granularity and a second m voltage correcting circuits configured to correct the communication signal according to the second adjustable granularity.

17. The equalizer of claim 16, further comprising a first input for receiving a command to set the first adjustable granularity for the first n voltage correcting circuits and a second input for receiving a command to set the second adjustable granularity for the second m voltage correcting circuits.

18. The equalizer of claim 11, wherein the equalizer is a component of a memory or a component of an optical data receiver.

19. A double data rate memory comprising the equalizer of claim 11.

* * * * *